(No Model.)

W. W. HICKS.
TREATMENT OF HUMUS AND MUCK.

No. 345,507. Patented July 13, 1886.

Witnesses
F. G. Fischer
L. Petric

Inventor
William W. Hicks

By his Attorney
L. Deane

UNITED STATES PATENT OFFICE.

WILLIAM W. HICKS, OF FORT MASON, FLORIDA.

TREATMENT OF HUMUS AND MUCK.

SPECIFICATION forming part of Letters Patent No. 345,507, dated July 13, 1886.

Application filed April 7, 1886. Serial No. 198,149. (No model.)

*To all whom it may concern:*

Be it known that I, WILLIAM W. HICKS, a citizen of the United States, residing at Fort Mason, in the county of Orange and State of Florida, have invented certain new and useful Improvements in Fertilizers, of which the following is a specification, reference being had therein to the accompanying drawings.

In portions of Florida immense deposits of vegetable matter are found in various stages and degrees of decomposition. The most valuable and plant-producing is called "muck." It is generally covered with heavy grass, known as "saw-grass," the roots of which are bulbous and are generally embedded a foot or more in soft muck and humus. These roots when reduced to ash contain a large per cent. of potash. The ordinary method of utilizing this muck is by exposure to the sun and atmosphere for months and composting it with stable-manure. No method until now has been found for its conversion into a fertilizer immediately available. The humus, which is the residuum of muck or pure vegetable matter decomposed, is found in quantities often to a depth of fifteen or twenty feet beneath the surface-muck, and has never been within reach for agricultural purposes in any quantity, on account of the difficulty of obtaining it, and, when obtained, on account of its acidity. I have discovered a method of calcining the humus and at the same time expelling all deleterious acids from the muck, thus enabling me to compound a most excellent and immediately-available fertilizer, all as will now be more fully explained, reference being had to the accompanying drawings, in which—

Figure 2:
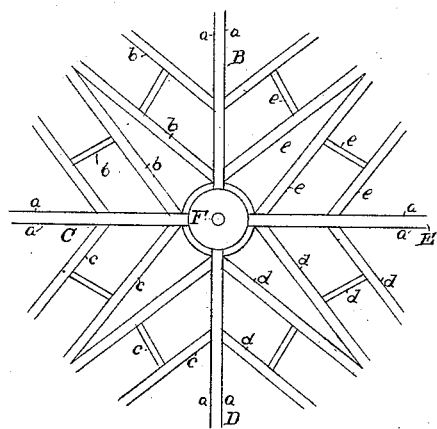
Figure 1:
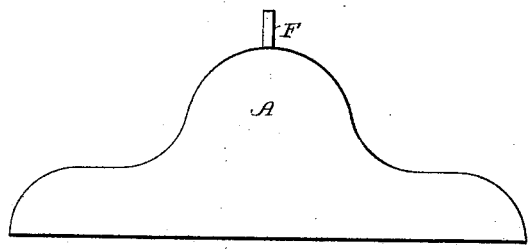

Figure 1 is a perspective view of the kiln. Fig. 2 is a ground plan view before the humus, &c., has been put on.

The ground is prepared as for a charcoal-pit. The plan view of the kiln A is in the form of a cross, the parallel lines *a a* representing main arches B, C, D, and E, which are at right angles to each other, meeting at the center F, which is made of a post or log of wood. These arches may be made on the surface of the ground by placing sticks or timbers two feet apart and of sufficient depth to admit of firing, and of any desirable length, or trenches may be cut and covered with wood for the support of the humus and muck to be calcined. Into these main arches or trenches B, C, D, and E, other and smaller ones, *b, c, d,* and *e,* are joined at any desired angle, so as to have as many smoke ducts or passages as possible, the smaller leading to the main ones, and they to the center, the object being to send heat and smoke through every part. A few sticks of wood are placed at the center so as to make sufficient fire to calcine the humus, and the arches are well covered with wood also, (green as possible,) and the main trenches filled with dry wood for firing. The humus is placed about the center of the kiln and in any quantity desired, according to size of kiln, amounting from one-third to one-half of the entire kiln, and the muck is placed outside, covering the humus completely from the center above down to the ground, thus covering the openings of all the small passages or ducts, leaving only the mouths of the main arches open. When thus arranged the arches or trenches may be fired, and as soon as the fire has obtained headway all arches should be closed except one—the windward arch—to admit air. The humus in the heart of the kiln, being in contact with the fire, calcines, and the muck outside is sweetened, and moisture and acids are expelled by the heat, and smoke forced through all the air-chambers and small arches. Firing should be kept up forty-eight hours, or until the outside muck shows signs of dryness and readily pulverizes, when the kiln should be taken down piece-meal and thrown together in a heap. It will be found that the humus in the center of the kiln has lost much if not all of its vegetable matter and becomes of a white or yellow color, as the case may be, and has become calcined, and upon exposure to the atmosphere crumbles into fine dust. It should be quickly mixed with the muck already dried, and sweetened by its subjection to smoke and heat. The whole is passed through a screen, and all roots are extracted thereby and burned in an open retort, furnishing a large per cent. of potash, which is added to the compound already formed. The humus and muck subjected to this process become at once available as fertilizer of the very best character, containing in high degree and in best form the essential elements of plant-food—namely, potash, lime, magnesia, and other essential substances—while the particles of carbon and charred roots serve to absorb from the atmosphere ammonia, and retain the same in the best form for plant life.

The chief novelty in this invention consists in purifying, sweetening, and preparing the muck for a fertilizer by means of heat and smoke.

Having now described my invention, what I consider new, and desire to secure by Letters Patent, is—

The herein-described fertilizer composed of calcined humus, combined with changed and sweetened muck, substantially as described.

In testimony whereof I affix my signature in presence of two witnesses.

WILLIAM W. HICKS.

Witnesses:
BEN. DOWD,
V. V. HAYNES.